US012789710B2

(12) United States Patent
Sauvage

(10) Patent No.: US 12,789,710 B2
(45) Date of Patent: Nov. 10, 2026

(54) CENTER CONSOLE HAVING A CONTROL MEMBER WITH TWO INTERNAL LIGHTING TRIGGERS, FOR A VEHICLE

(71) Applicant: STELLANTIS AUTO SAS, Poissy (FR)

(72) Inventor: Sebastien Sauvage, Grand Charmont (FR)

(73) Assignee: Stellantis Auto SAS, Poissy (FR)

( * ) Notice: Subject to any disclaimer, the term of this patent is extended or adjusted under 35 U.S.C. 154(b) by 313 days.

(21) Appl. No.: 18/684,810

(22) PCT Filed: Sep. 5, 2022

(86) PCT No.: PCT/FR2022/051675
§ 371 (c)(1),
(2) Date: Feb. 19, 2024

(87) PCT Pub. No.: WO2023/052702
PCT Pub. Date: Apr. 6, 2023

(65) Prior Publication Data

US 2024/0359629 A1 Oct. 31, 2024

(30) Foreign Application Priority Data

Sep. 30, 2021 (FR) ...................................... 2110299

(51) Int. Cl.
*B60R 7/04* (2006.01)
*B60Q 3/82* (2017.01)
*B60R 11/00* (2006.01)

(52) U.S. Cl.
CPC .................. *B60R 7/04* (2013.01); *B60Q 3/82* (2017.02); *B60R 2011/0007* (2013.01)

(58) Field of Classification Search
CPC ............. B60R 11/00; B60R 2011/0028; B60R 2011/0064
See application file for complete search history.

(56) References Cited

U.S. PATENT DOCUMENTS

2019/0257123 A1 8/2019 Suzuki

FOREIGN PATENT DOCUMENTS

DE 1 605 897 A1 10/1970
DE 24 42 957 A1 3/1976
(Continued)

OTHER PUBLICATIONS

International Search Report for PCT/FR2022/051675 mailed Dec. 7, 2022.
Written Opinion for PCT/FR2022/051675 mailed Dec. 7, 2022.

*Primary Examiner* — Dany E Akakpo
(74) *Attorney, Agent, or Firm* — Sandberg Phoenix and von Gontard, PC

(57) ABSTRACT

A center console (CC) for a vehicle, comprising a box (BC) comprising a stowage space to which access is controlled by two movable flaps (V1-V2), each having closed and open positions and being associated with an internal lighting device that has off and on states which are controlled, respectively, by open and closed states of a control member (OC) comprising two triggers (DO1-DO2) which are respectively associated with the movable flaps (V1-V2) and are each capable of being independently placed in a first position which brings about the open state or a second position which brings about the closed state depending on whether the associated movable flap (V1, V2) is in the closed or open position.

10 Claims, 5 Drawing Sheets

(56) References Cited

FOREIGN PATENT DOCUMENTS

| | | | | | |
|---|---|---|---|---|---|
| DE | 102012022714 | A1 * | 5/2013 | ............... | B60R 7/04 |
| DE | 102019203535 | A1 * | 9/2020 | ............... | B60R 7/02 |
| FR | 2789954 | A1 | 8/2000 | | |
| JP | H07-246878 | A | 9/1995 | | |
| JP | 2006-283415 | A | 10/2006 | | |

* cited by examiner

[Fig. 1]
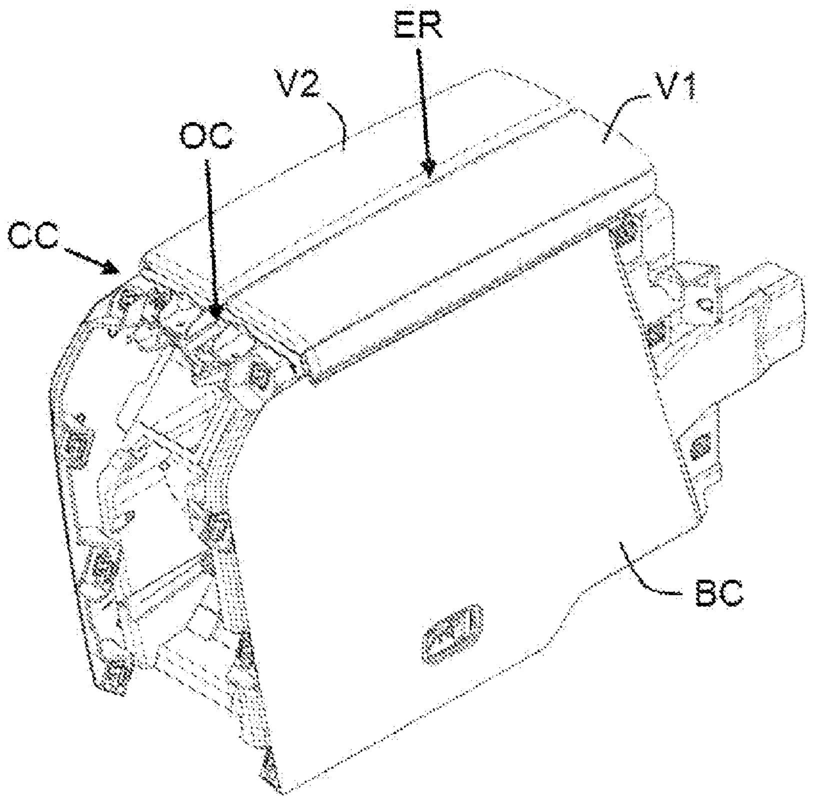

[Fig. 2]
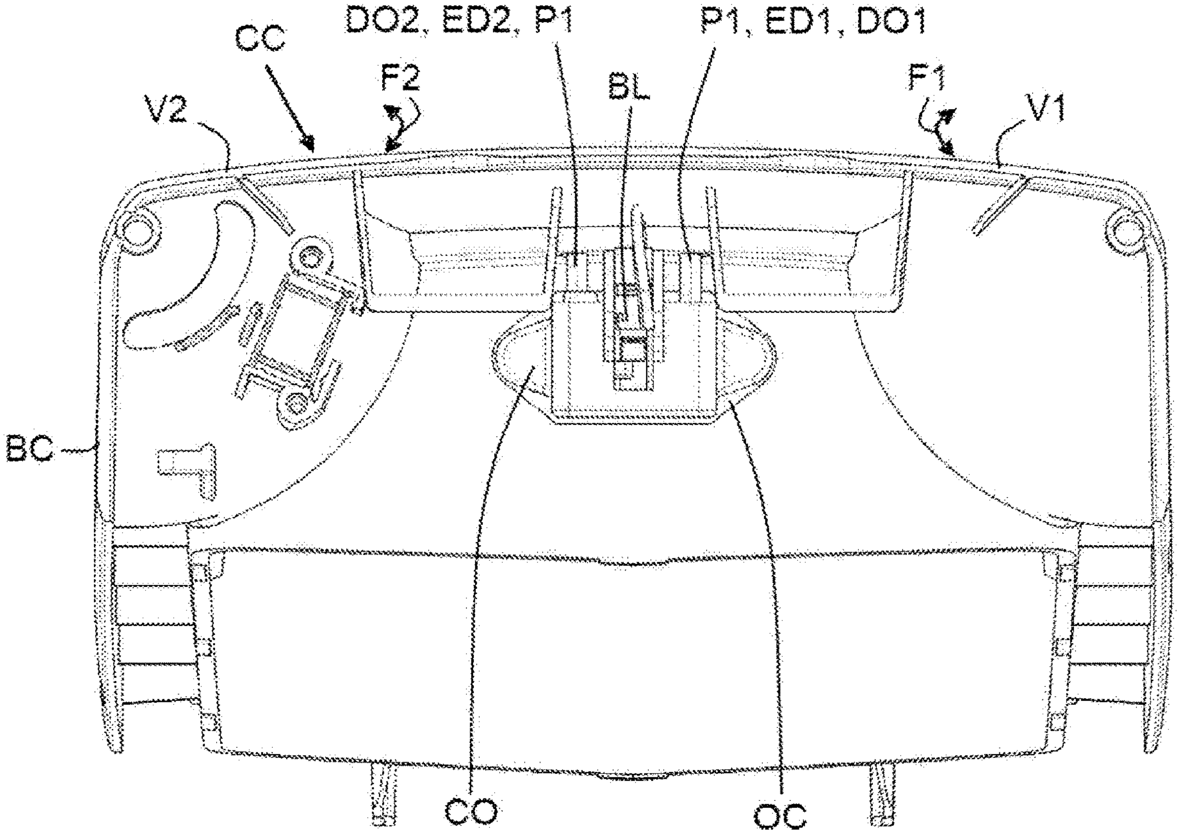

[Fig. 3]
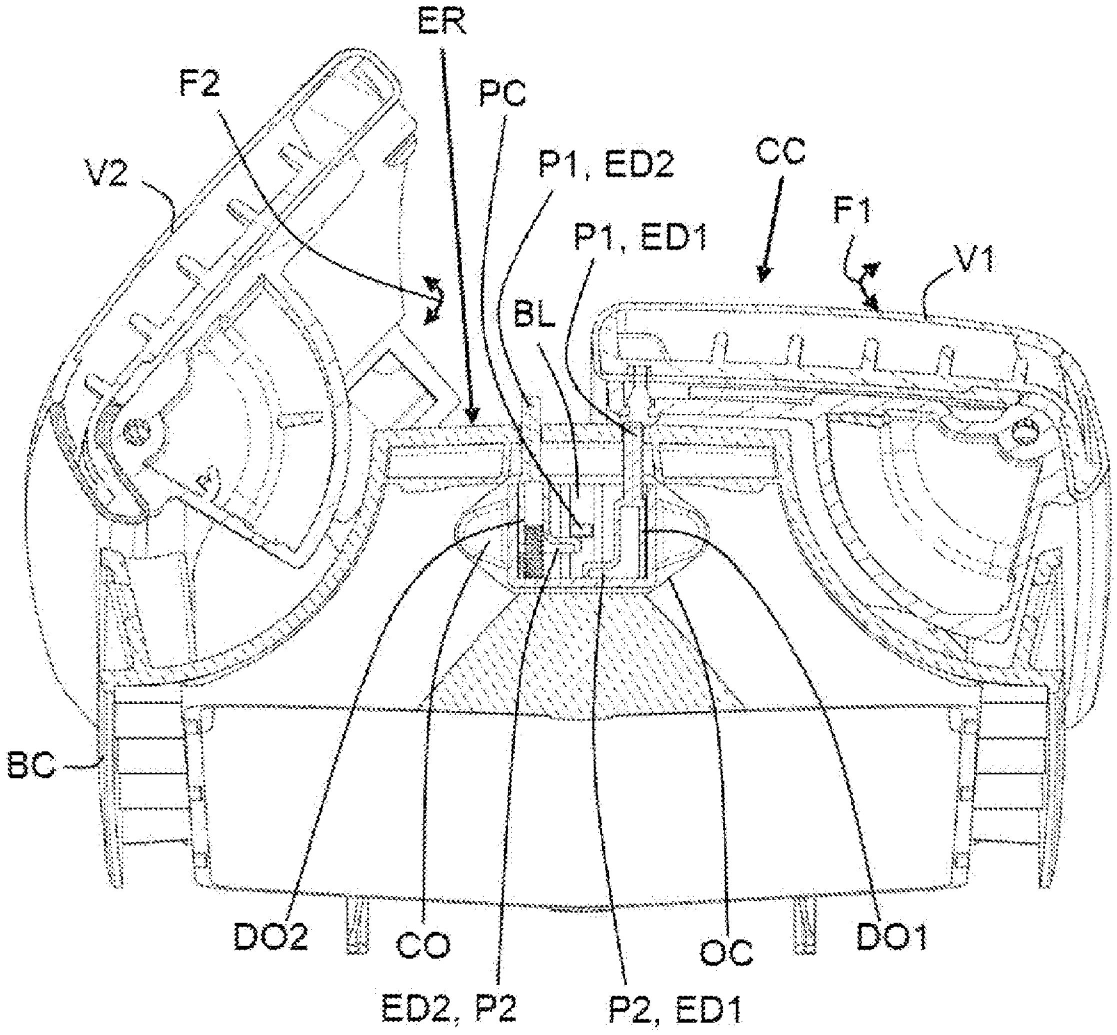

[Fig. 4]
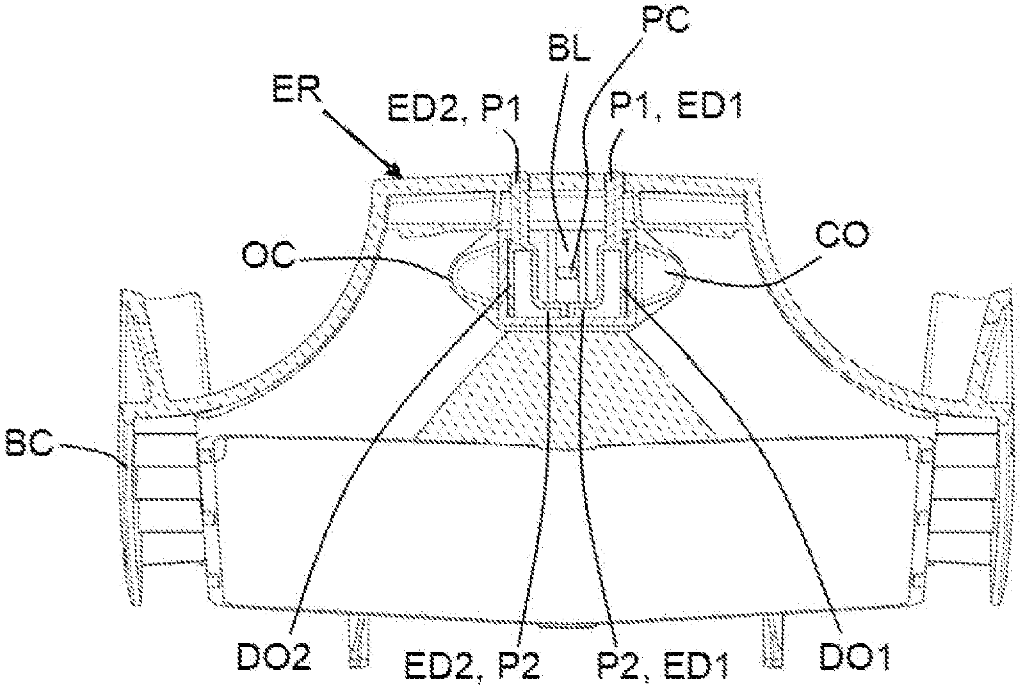
[Fig. 5]
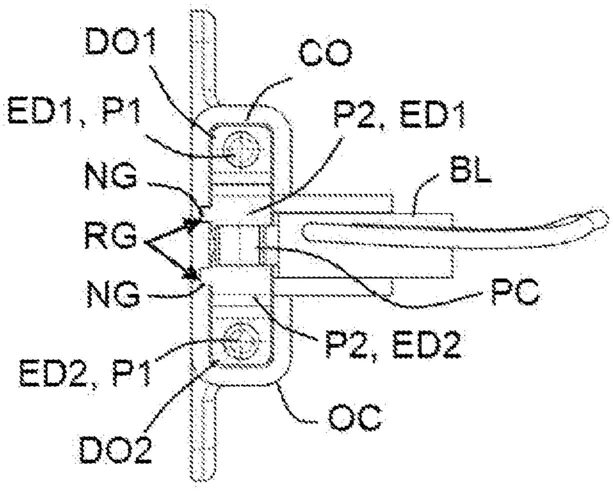

[Fig. 6]
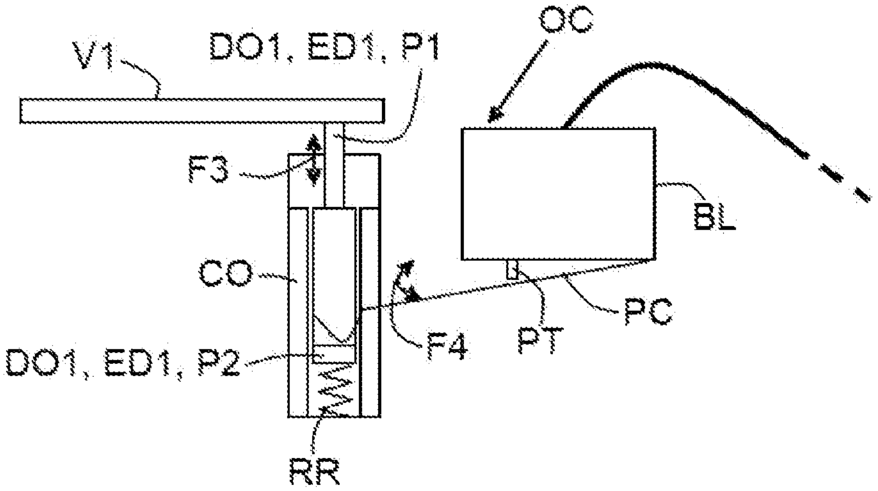
[Fig. 7]
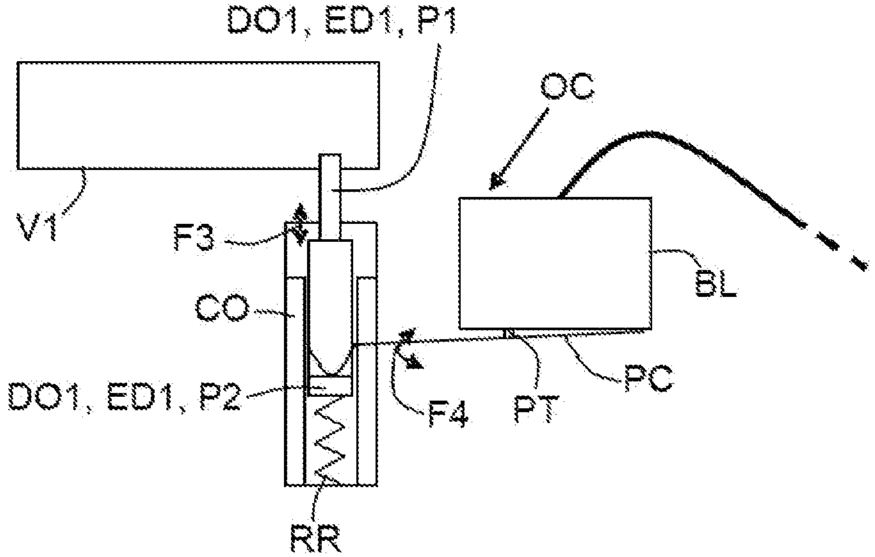

CENTER CONSOLE HAVING A CONTROL MEMBER WITH TWO INTERNAL LIGHTING TRIGGERS, FOR A VEHICLE

CROSS-REFERENCE TO RELATED APPLICATIONS

This application is the US National Stage under 35 USC § 371 of International Application No. PCT/FR2022/051675, filed Sep. 5, 2022, which claims the priority of the French application 2110299 filed on Sep. 30, 2021, the content (text, drawings and claims) of both said applications being incorporated by reference herein.

BACKGROUND

The devices described herein relate to vehicles, and more specifically center consoles which are intended to be installed in vehicles.

Some vehicles, generally of the motor vehicle type, comprise, generally in a passenger compartment between two right and left seats, a center console comprising a box wherein a stowage space associated with an internal lighting device is defined.

In some of these center consoles, access to the stowage space is controlled by two movable flaps (for example right and left) which optionally and respectively constitute the armrests (right and left) for the passengers (right and left). For example, these two movable flaps can be mounted to rotate on the box. Each of these movable flaps has a closed position (partially preventing access to the stowage space) and an open position (allowing access to the stowage space).

Currently, the internal lighting device of the stowage space has off and on states which are controlled respectively by open and closed states of a single control member which is associated with one of the two movable flaps, generally the one which is close to the driver's seat. It is therefore only when the movable flap neighboring the driver's seat switches from its closed position to its open position that this causes the control member to switch from its open state to its closed state. In other words, when the movable flap close to the driver's seat remains in its closed position and the movable flap neighboring the passenger seat switches from its closed position to its open position, the control member remains in its open state (preventing the internal lighting), which is not enjoyed by the passenger and is potentially considered as a design defect which is detrimental to the impression of general quality.

In addition, when the movable flaps are rotating, the control member generally comprises a translatable control pin on which a part of the movable flap is located close to the driver's seat, generally a little before the end of its rotation (toward its open position). However, this action causes a substantial decrease in the rotational speed of the movable flap close to the driver seat, and therefore when the opening of the two movable flaps is simultaneous, the movable flap neighboring the passenger seat arrives in its open position before the movable flap neighboring the driver seat, which may be considered by the passengers to be a malfunction or a design defect which is detrimental to the impression of general quality.

The described devices therefore aim especially to improve the situation.

SUMMARY

In particular, proposed for this purpose is a center console intended to be installed in a vehicle and comprising a box comprising a stowage space with access controlled by two movable flaps each having closed and open positions and associated with an internal lighting device having off and on states controlled respectively by open and closed states of a control member.

This center console is characterized by the fact that its control member comprises two triggers, associated respectively with the movable flaps, and each able to be placed independently in a first position which brings about the open state or a second position which brings about the closed state depending on whether the associated movable flap is in the closed or open position.

Thus, as soon as at least one of the two movable flaps switches from its closed position to its open position, the internal lighting device is able to illuminate the stowage space and therefore operates for both passengers, and the two movable flaps acting on the control member, they simultaneously reach their open position when they are opened simultaneously.

The center console may include other features which can be taken separately or in combination, and especially:

- its control member may comprise a control part having third and fourth positions causing respectively the open and closed states. In this case, each trigger may comprise an element translatable between its first and second positions during a change in position of the associated movable flap in order to cause the control part to switch from its third position to its fourth position, or vice versa;
- in the presence of the first option, the control part can be in its fourth position when one of the triggers is in its second position, regardless of the position of the other trigger;
- also in the presence of the first option, its control member may comprise a translatable pin on which the control part exerts, in its fourth position, a pressure able to cause the closed state;
- in the presence of the last sub-option, the control part can be rotatably mounted and able to exert the pressure when it is rotated from its third position to its fourth position by one of the elements;
- also in the presence of the last sub-option, the control member may comprise a body comprising the triggers and a control block comprising an electronic circuit comprising the translatable pin, having the open and closed states and coupled to the internal lighting device;
- in the presence of the last sub-sub-option, each of the triggers can be installed in the body with a return force which is able to push it automatically from its first position to its second position when the associated movable flap switches from its closed position to its open position;
- also in the presence of the first option, each element may comprise a first part on which the associated movable shutter acts, and a second part extending this first part and able to act on the control part;
- each of the movable flaps can be mounted to rotate relative to the box.

Also proposed is a vehicle, optionally of the automobile type, and comprising a center console of the type of that presented above.

BRIEF DESCRIPTION OF THE FIGURES

Other features and advantages will become apparent on examining the detailed description below, and the appended drawings (the first five of which were obtained using CAD (Computer-Assisted Design)), wherein:

FIG. 1 schematically shows, in a perspective view from the right side, an embodiment of a center console, intended to be installed in a passenger compartment of a vehicle.

FIG. 2 schematically shows, in a front view of the rear side, the center console of FIG. 1 with both its flaps in the closed position.

FIG. 3 schematically shows, in a cross-sectional view in a transverse vertical plane at the control member, the center console of FIG. 1 with its right flap in the closed position and its left flap in the open position.

FIG. 4 schematically shows, in a cross-sectional view in a transverse vertical plane at the control member, the upper part of the box of the center console of FIG. 1 when the two triggers of the control member are in their first position (corresponding to flaps in the closed position).

FIG. 5 schematically shows, in a top view, the example of a control member of the box of the center console of FIG. 1.

FIG. 6 schematically and functionally shows, in a cross-sectional view in a longitudinal vertical plane, a right part of the example of the control member of the center console box of FIG. 1, when the right flap is in the closed position.

FIG. 7 schematically and functionally shows, in a cross-sectional view in a longitudinal vertical plane, a right part of the example of the control member of the center console box of FIG. 1, when the right flap is in the open position.

DETAILED DESCRIPTION

The object is in particular to propose a center console CC, intended to be installed in a vehicle, and comprising an internal lighting device controlled by a control member OC having two triggers DOj respectively associated with two flaps Vj.

In what follows, the center console CC is considered by way of example to be part of a motor vehicle, for example a car. However, the described devices are not limited to this type of vehicle. Indeed, they relate to any vehicle (ground, sea (or river-based) or aerial vehicle) that may comprise at least one center console.

Furthermore, it is considered in what follows, by way of non-limiting example, that the center console CC is intended to be installed between right and left front seats (of a row) of a motor vehicle passenger compartment. However, the described devices are not limited to this application. Thus, the center console CC could be installed between right and left seats of an intermediate or rear row of a vehicle passenger compartment, for example.

FIGS. 1 to 3 schematically show an embodiment of a center console CC, at least partially.

As shown in FIGS. 1 to 3, a center console CC, comprises at least one box BC, two movable flaps Vj (j=1 or 2), an internal lighting device (not shown), and a control member OC.

In the following and the preceding, the letter j associated with the alphanumeric reference of an element of a Figure denotes the right side (j=1) or left (j=2) of this element, with reference to the right and left sides of the vehicle, by way of illustrative example.

The box BC comprises a stowage space ER whose access is controlled by the two movable flaps Vj which each have a closed position (shown in FIG. 1) and an open position (shown on the left part of FIG. 2). For example, and as shown in a non-limiting manner in FIGS. 1 to 3, each of the movable flaps Vj can be mounted to rotate relative to the box BC, and the directions of rotation of the movable flaps Vj (arrows F1 and F2) can be opposite one another. However, in a variant embodiment, the movable flaps Vj could be translatable.

Also for example, and as shown in a non-limiting manner in FIGS. 1 to 3, the movable flaps Vj can respectively constitute armrests (here right and left) for passengers (here front and right and left).

The internal lighting device is responsible for lighting the stowage space ER when at least one of the movable flaps Vj is in its open position. It therefore has an off state and an on state which are controlled respectively by an open (or off) state and a closed (or on) state of the control member OC.

The control member OC comprises two triggers DOj which are associated respectively with the movable flaps Vj. In other words, the trigger (here right) DO1 (j=1) is associated with the movable flap (here right) V1, and the trigger (here left) DO2 (j=2) is associated with the movable flap (here left) V2.

These two triggers DOj are each able to be placed independently in a first position (shown on the right part of FIG. 3 and FIGS. 4 and 6) which brings about the open state of its control member OC or in a second position (shown on the left part of FIG. 3 and FIG. 7) which brings about the closed state of its control member OC depending on whether the associated movable flap Vj is in the closed or open position. In other words, when the right movable flap V1 switches from its closed position to its open position, the right trigger DO1 switches from its first position (corresponding to the open state and therefore to the placement of the internal lighting device in its off state) to its second position (corresponding to the closed state and therefore to the placement of the internal lighting device in its on state). Likewise, when the left movable flap V2 switches from its closed position to its open position, the left trigger DO2 switches from its first position (corresponding to the open state and therefore to the placement of the internal lighting device in its off state) to its second position (corresponding to the closed state and therefore to the placement of the internal lighting device in its on state).

By virtue of this control member OC with two triggers DOj, as soon as at least one of the two movable flaps Vj switches from its closed position to its open position, the internal lighting device is able to illuminate the stowage space ER, and therefore this lighting is now offered to both the right passenger and the left passenger. In addition, as the two movable flaps Vj act on the control member OC, when they switch simultaneously from their closed position to their open position, they are subjected to the same decrease in their speed (here of rotation) and therefore simultaneously reach their open position. There is therefore no longer any malfunction or design defect of the center console CC detrimental to the impression of general quality.

For example, and as shown in a non-limiting manner in FIGS. 3 to 7, the control member OC can comprise a control part PC having a third position (shown in FIG. 6) causing its placement in the open state and a fourth position (shown in FIG. 7) causing its placement in the closed state. In this case, and as shown in a non-limiting manner in FIGS. 3 to 7, each trigger DOj may comprise an element EDj which is translatable (arrow F3) between its first and second positions during a change of position of the associated movable flap Vj in order to cause the control part PC to switch from its third position to its fourth position (arrow F4), or vice versa.

It will be understood that the two elements EDj act on the same control part PC as shown in FIGS. 3 to 5. To this end, the control part PC can be installed in a position centered relative to the median plane (vertical and longitudinal) of the center console CC, so that the right element ED1 acts on a first one of its sub-parts and that the left element ED2 acts on a second one of its sub-parts (optionally close to this first sub-part as shown in FIGS. 3 to 5). In this case, the control part PC is arranged so as to be in its fourth position when one of the triggers DOj is in its second position, regardless of the position of the other trigger DOj'.

For example, and as shown in a non-limiting manner in FIGS. 3 to 7, each element EDj may comprise a first part P1 on which the associated movable flap Vj acts (in particular when it is in the closed position), and a second part P2 extending the first part P1 and able to act on the control part PC. In the example shown, the second part P2 of an element EDj transversely extends its first part P1 towards the control part PC and the second part P2 of the other element EDj'. Also for example, and as shown in a non-limiting manner in FIGS. 6 and 7, the control part PC may be in the form of a rigid (non-deformable) blade (or rod), having a free end on which the elements EDj act and optionally having a curvature. In this example arrangement, the right element ED1 acts on a right sub-part of the free end of the control part PC and the left element ED2 acts on a left sub-part of the free end of the control part PC, located just next to this right sub-part.

However, other example arrangements can be envisaged. Thus, the elements EDj could be mounted to rotate, for example.

Also for example, and as shown in a non-limiting manner in FIGS. 6 and 7, the control member OC can comprise a translatable pin PT on which the control part PC exerts, in its fourth position, a pressure able to cause the closed state. In other words, and as shown in FIG. 6, when the control part PC is in its third position, it does not exert pressure on the translatable pin PT, which is then in a "rest" (or inactive) position associated with the open state. On the other hand, as shown in FIG. 7, when the control part PC is in its fourth position it exerts a pressure on the translatable pin PT which is then translated into an "active" position associated with the closed state.

To obtain this result, the control part PC can, as shown in a non-limiting manner in FIGS. 6 and 7, be rotatably mounted so that the translation (here upward (arrow F3)) of an element EDj (due to the opening of the associated movable flap Vj) causes it to rotate (here upward (arrow F4)).

However, in a variant embodiment, the control part PC could be translationally mounted, and in this case the movement of an element EDj (by translation or rotation) would cause it to translate and therefore cause the translatable pin PT to translate.

Also for example, and as shown in a non-limiting manner in FIGS. 5 to 7, the control member OC may comprise a body CO comprising the triggers DOj and a control block BL comprising an electronic circuit comprising the translatable pin PT and coupled to the internal lighting device. In this case, it is this electronic circuit which has the open state when its translatable pin PT is in its rest position (not translated-FIG. 6) and the closed state when its translatable pin PT is in its active position (translated-FIG. 7). In the example shown in a non-limiting manner in FIGS. 6 and 7, the control part PC is mounted to rotate on the control block BL, for example on the wall which is crossed by the translatable pin PT. However, in an alternative embodiment it could be rotatably mounted on the body CO.

It will also be noted that in the example shown in a non-limiting manner in FIGS. 2 to 7, the body CO comprises two open housings wherein the triggers DOj respectively move (here by translation).

It will also be noted, as shown in a non-limiting manner in FIG. 5, that the body CO may comprise two linear guide grooves RG communicating respectively with its two open housings, and the two elements EDj can respectively comprise two linear guide ribs NG housed respectively in the two guide grooves RG to guide their translation. This makes it possible to prevent the transverse movements of the two elements EDj which could disrupt the operation of the control member OC. A reverse arrangement can also be envisaged (namely two elements EDj respectively comprising two linear guide grooves and a body CO comprising two linear guide ribs housed respectively in the two guide grooves).

It will also be noted, as shown in a non-limiting manner in FIGS. 6 and 7, that each of the triggers DOj can advantageously be installed in the body CO with a return force which is able to push it automatically from its first position (FIG. 6) to its second position (FIG. 7) when the associated movable flap Vj switches from its closed position to its open position.

For example, and as shown in a non-limiting manner in FIGS. 6 and 7, the two return forces can be provided by two return springs (or blades) RR which are installed respectively in the two open housings of the body CO under the triggers DOj. It will be understood that when a movable flap Vj is in its closed position, it holds the associated trigger DOj in its first position (the lowest position), which compresses the return spring RR, whereas when a movable flap Vj opens, the position of the associated trigger DOj is no longer blocked and therefore the return spring RR automatically translates the latter (DOj) upward (and therefore to its second position) and is slightly or not compressed.

The invention claimed is:

1. A center console intended to be installed in a vehicle and comprising a box comprising a stowage space with access controlled by two movable flaps, each having closed and open positions and being associated with an internal lighting device having off and on states which are controlled, respectively, by open and closed states of a control member, wherein said control member comprises two triggers which are associated respectively with said movable flaps, and are each capable of being placed independently in a first position which brings about said open state or a second position which brings about said closed state depending on whether said associated movable flap is in the closed or open position;

wherein said control member comprises a control part having third and fourth positions respectively causing said open and closed states, and in that each trigger comprises an element translatable between its first and second positions during a change in position of said associated movable flap in order to cause said control part to switch from its third position to its fourth position, or vice versa; each of the elements acting on the same control part.

2. The center console according to claim 1, wherein said control part is in its fourth position when one of said triggers is in its second position, regardless of the position of the other trigger.

3. The center console according to claim 1, wherein said control member comprises a translatable pin on which said control part exerts, in its fourth position, a pressure capable of causing said closed state.

4. The center console according to claim 1, wherein each element comprises a first part on which said associated movable flap acts, and a second part extending said first part and able to act on said control part.

5. The center console according to claim 1, wherein each of said movable flaps is rotatably mounted relative to said box.

6. A vehicle, wherein it further comprises at least one center console according to claim 1.

7. A center console intended to be installed in a vehicle and comprising a box comprising a stowage space with access controlled by two movable flaps, each flap having closed and open positions and being associated with an internal lighting device having off and on states which are controlled, respectively, by open and closed states of a control member, wherein said control member comprises two triggers which are associated respectively with said movable flaps, and are each capable of being placed independently in a first position which brings about said open state or a second position which brings about said closed state depending on whether said associated movable flap is in the closed or open position;

wherein said control member comprises a control part having third and fourth positions respectively causing said open and closed states, and in that each trigger comprises an element translatable between its first and second positions during a change in position of said associated movable flap in order to cause said control part to switch from its third position to its fourth position, or vice versa; and wherein said control member comprises a translatable pin on which said control part exerts, in its fourth position, a pressure capable of causing said closed state.

8. The center console according to claim 7, wherein said control part is rotatably mounted and able to exert said pressure when it is rotated from its third position to its fourth position by one of said elements.

9. The center console according to claim 7, wherein said control member comprises a body comprising said triggers and a control block comprising an electronic circuit comprising said translatable pin, having said open and closed states and coupled to said internal lighting device.

10. The center console according to claim 9, wherein each of said triggers is installed in said body with a return force able to push it automatically from its first position to its second position when said associated movable flap switches from its closed position to its open position.

* * * * *